Oct. 11, 1927.
D. A. STEWART
1,645,309
INTERNAL COMBUSTION ENGINE
Filed May 19, 1923
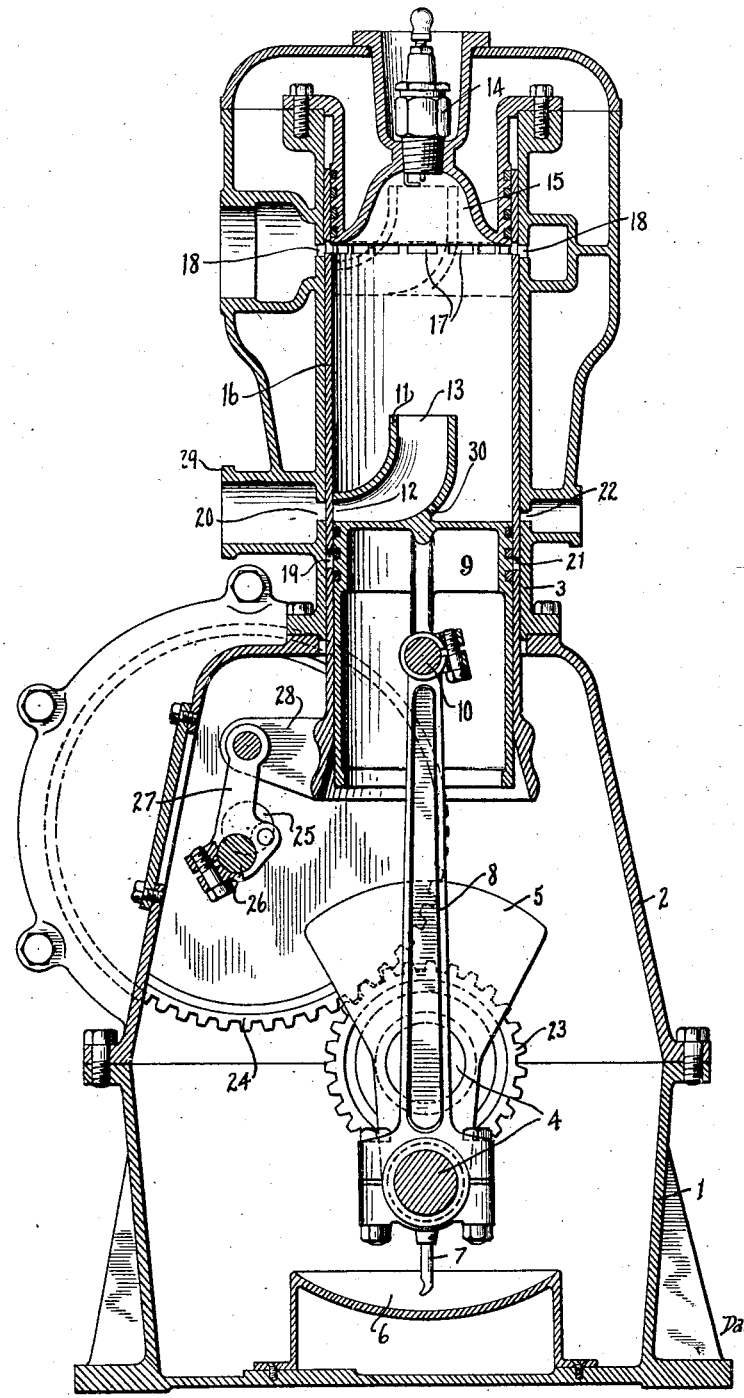
Inventor
David A. Stewart.
By
Attorney Patented Oct. 11, 1927.

1,645,309

UNITED STATES PATENT OFFICE.

DAVID A. STEWART, OF LISTOWEL, ONTARIO, CANADA.

INTERNAL-COMBUSTION ENGINE.

Application filed May 19, 1923. Serial No. 640,169.

This invention relates to internal combustion engines and the object of the invention is to provide an engine of the four cycle type in which a sleeve valve is utilized operating in conjuction with the piston to control the intake and exhaust ports of the explosion chamber. A further object of the invention is to provide an internal combustion engine of the character described in which air is introduced into the cylinder during the introduction of the explosive charge, the oxygen of the air assisting in the combustion in the explosion chamber and preventing the deposit of carbon. Another object of the invention is to provide an internal combustion engine in which a slow burning rich charge is provided about the spark plug and the charge decreases in richness from the spark plug downward to the piston so that the explosion is gradual and increases in intensity as the piston travels downward. A further object of this invention is to provide an internal combustion engine of the four cycle type having a sleeve valve controlling the exhaust port and operating in conjunction with the piston to control the fuel and air intake ports preferably in a manner to introduce the air at approximately the same time as the fuel charge is introduced and segregating a part of the fuel charge in its original state to be ignited by the spark plug and ignite the remaining charge within the cylinder. Another object of the invention is to provide an internal combustion engine in which the fuel charge and air is introduced by a vacuum released to the air and fuel intake conduits at the bottom of the intake stroke of the piston. These objects and the several novel features of the invention are hereinafter more fully described and claimed and the preferred form of construction by which these objects are attained is shown in the accompanying drawings in which—

The figure is a transverse vertical cross section of an internal combustion engine embodying my invention.

The crank case is formed of two parts 1 and 2 and the cylinder 3 is bolted on top of the crank case portion 2. The crank 4 is of the counter-balanced type being provided with counter-balances 5 and an oil reservoir 6 is provided through which an oil splasher 7 is adapted to pass. A connecting rod 8 is connected at one end to the crank shaft and at the opposite end to the piston 9 by a wrist pin 10. Formed on the upper end of the piston 9 is an upwardly extending tubular portion 11 having an opening 12 at the side of the piston and an opening 13 of equal area centrally over the piston and open to the cylinder. A spark plug 14 is provided in the top of the cylinder and the cylinder at the upper end is provided with a recess 15 into which the end of the tubular member 11 is adapted to extend as shown in dotted lines in the drawings. The piston 9 is reciprocable in a sleeve 16 having apertures 17 in the upper end thereof adapted to be brought in registration with the exhaust port 18 during movement of the sleeve. The sleeve 16 is also provided with an aperture 19 adapted during operation of the engine to be brought to registration with the carburetor intake port 20 and is also provided with an aperture 21 adapted to be brought to registration with an air intake port 22. A gear 23 is secured to the crank shaft 4 and meshes with the gear 24 which is mounted on a rotatable stud shaft 25. A pin 26 is secured to the gear 24 and extends from the face thereof and a pitman 27 is rotatably mounted on the pin 26, the upper end of the pitman being pivotally connected to an arm 28 formed integrally with the sleeve 16. The gears 23 and 24 are in the ratio of two to one so that two rotations of the gear 23 produces one complete rotation of the gear 24.

The engine is shown in the drawing at the beginning of the exhaust stroke and rotation of the gear 23 and crank shaft 4 is in a counterclockwise direction producing a clockwise rotation of the gear 24 and crank pin 26 thereon. As the piston moves upwardly from the position shown in the drawing, the exhaust gases are discharged through the discharge ports 17 and 18 which are held in the open position until just before the piston reaches the top of its movement at which time the sleeve is raised by the pitman 27 to close the exhaust ports. As the piston moves downwardly the sleeve is raised by the pitman 27 so that the aperture 19 in the sleeve registers with the fuel intake port 20 at the time the piston reaches the bottom of the stroke. As the aperture 19 comes to registration with the fuel intake port 20 the opening 12 in the tubular portion 11 on the piston is also brought to registration with the intake port and, due to the vacuum in the cylinder, this intake charge passes upwardly through the tube 11 and into the top of the cylinder. The aperture 21 in the sleeve is brought to registration with the air intake aperture 22 at the same time which, due to the vacuum in the cylinder, draws the air in and about the tubular member 11 and top of the piston. The carburetor is connected to the intake manifold 29 and is set to provide a very rich fuel charge which will burn with comparative slowness when ignited. As this rich charge passes into the upper part of the cylinder, air is admitted to the lower part of the cylinder which settles about the tubular portion 11 and some of the rich mixture is left within the said tubular portion. As the piston passes upwardly to compress the gas within the cylinder, the tubular portion 11 comes to position to surround the terminals of the spark plug 14 which ignites the rich gas remaining in the portion 11. This rich mixture burns slowly at first and is communicated to the remaining gas in the cylinder which is partially mixed with the air which enters through the port 22 and the charge becomes thinner downwardly toward the top of the piston. As the fire passes downwardly into the thinner mixture it increases in speed and terminates in an explosion which sends the piston downwardly. It will thus be seen that at the beginning of the explosion stroke the piston travels slowly and as the explosion increases in intensity the piston travels downwardly with greater velocity having something of the smoothness of operation of a steam engine piston. By pocketing the rich charge in the portion 11 the slow burning mixture acts as a torch to set off the thinner charge and the member 11 is provided with an aperture 30 for the purpose of permitting flame to pass from the interior of the member 11 outwardly into the surrounding thinner mixture. While some residue of burned gases may be left in the portion 11, a new charge passing inwardly therethrough sweeps out the burned gases and again pockets a rich mixture in the said portion. In this type of engine and arrangement of parts when used with a multi-cylinder engine, there is no "overlapping" in the action of the valves as happens with the usual four-cycle type of engine. In other words, there is no two cylinders opening to the intake manifold at the same time for the reason that the charge is taken in at the bottom of the piston stroke. There can also be no back-firing into the carburetor with the construction herein disclosed as such backfire is prevented by reason of the charge being taken in as stated.

The carburetor is not shown in the drawing, but it is to be understood that any type of carburetor may be utilized by which the quantity and quality of the explosive charge may be varied and, as is the common and usual practice, it is preferred to heat this incoming charge to temperature above that of normal atmosphere.

From the foregoing description it becomes evident that the device is very simple and efficient in operation, having no parts which are apt to get out of order, does not increase the cost of manufacture of an engine of this type to any appreciative extent and provides a device which accomplishes the objects described.

Having thus fully described my invention, its utility and mode of operation, what I claim and desire to secure by Letters Patent of the United States is—

In an internal combustion engine, a cylinder, having an exhaust port near the upper end and fuel and air intake ports near the lower end, a piston reciprocable within the cylinder, a tubular portion on the upper end of the piston and having an opening at the side of the piston adapted to be brought to communication with the fuel intake port during reciprocation, a spark plug in the upper end of the cylinder, an opening at the opposite end of the tubular portion leading into the combustion cylinder, and means adapted to move said lower opening in the tube to enclose the spark plug at the top of the piston stroke, said tubular portion having a gas flame opening in the wall of the said tubular portion intermediate its length below said upper end, a sleeve reciprocable within the cylinder between the piston and cylinder wall and ported to register during reciprocation with the exhaust port of the cylinder and the fuel and air intake ports, the reciprocal movement of the piston and sleeve being in the proportion of two to one.

In testimony whereof, I sign this specification.

DAVID A. STEWART.